United States Patent Office 3,383,227
Patented May 14, 1968

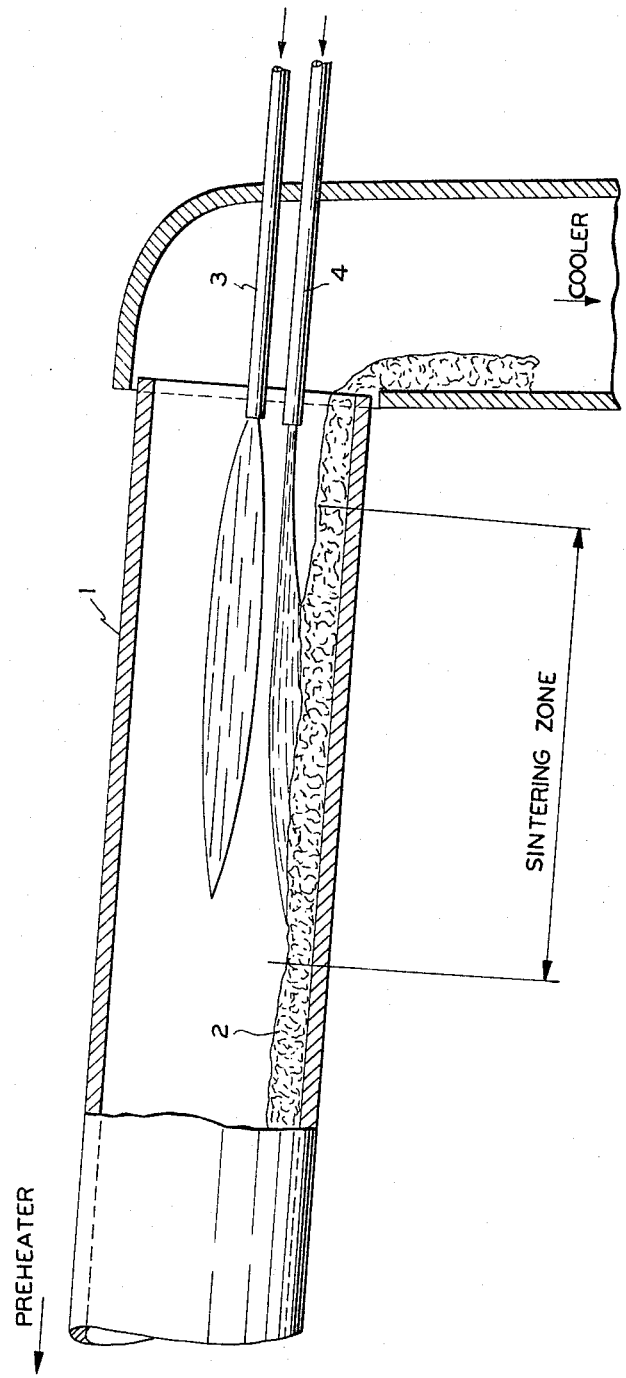

3,383,227
MANUFACTURE OF REFRACTORY MATERIAL
Josef Wuhrer, 2 August Thyssenstrasse, and Karl-Heinz Obst, 58 Flehenberg, both of Wulfrath, Rhineland, Germany
Continuation-in-part of application Ser. No. 407,761, Oct. 30, 1964. This application Jan. 12, 1967, Ser. No. 622,378
Claims priority, application Germany, Mar. 19, 1964, D 43,926
2 Claims. (Cl. 106—58)

ABSTRACT OF THE DISCLOSURE

In order to prevent or reduce the formation of fire rings in the manufacture of refractory material, the fluxing agent is blown in the form of coarse particles from the discharge end into a dolomite burning kiln independently of, and below, the fuel injection so as to be deposited on the dolomite in, or immediately in front of, the sintering zone.

---

This application is a continuation-in-part of our application Ser. No. 407,761, filed Oct. 30, 1964, now abandoned.

This invention relates to the production of burnt dolomite, magnesite and lime.

For the production of such burnt materials, raw dolomite, magnesite, or limestone, are fired in a rotary kiln at very high temperatures which depend, to a certain extent, on the amount of impurities present. Such burnt product is then broken, pressed, and again fired, whereupon it may be dipped in tar to be better protected against air moisture. The thus obtained refractory is a useful material for the lining of furnaces in iron and steel production. The quality of such linings, that is their life in converters or Siemens-Martin furnaces, depends to a large extent on the porosity of the sintered product, which, in turn, is a function of the density.

The sintering depends on the structure of the raw stone whereby sedimentary packings are better than the denser crystalline packings; also the amount and type of impurities, particularly of $SiO_2$, is of importance.

In the production of burnt dolomite, it is desired to obtain a sintered dolomite of uniform high density which provides for improved resistance to attack by the slag and moisture. Such high density is obtained by high firing temperatures which require a high consumption of fuel.

In order to lower the firing temperature, fluxing agents, particularly iron oxide, have been added to the crushed raw rock. Such fluxing agents have the drawback to favor formation of deposits and annular bulges on the inner lining of the rotary kiln and to penetrate into the lining so as to produce early deterioration and destruction thereof. Such so-called fire rings keep growing and increasingly interfere with the continuous operation of the kiln by obstructing the passage of the material and reducing locally the free diameter of the kiln, thereby disturbing the flow of the firing gases and producing temperature oscillations. So far, no satisfactory method has been found to prevent the formation of such annular bulges, and it has been necessary to develop specific methods and devices for removing such fire rings at regular intervals. These methods increase the cost of production and require shutting down the kilns.

It has already been proposed to introduce fluxing agent in a finely ground or pulverulent condition with the fuel blast from the discharge end of the kiln. This method did not solve the problem of the fire rings either because the particles of the fluxing agent were partially molten in the flame, thereby losing substantially their reactivity, and where blown so far towards the inlet that they had the same effect as if introduced from the inlet, i.e., the fire rings were formed. Increasing the particle size did not help because the force of the blast of the combustion gases which in the sintering zone have generally a velocity of at least 8–10 m./sec., was still strong enough to carry the fluxing agent far beyond the sintering zone; in addition, such larger particles erode very quickly the burner nozzles.

We have now found that said difficulties can be avoided by injecting the fluxing agent in not too finely divided form from the discharge end separately from the fuel feed in such a way that the particles of the fluxing agent are deposited on the dolomite or magnesite at the beginning of the sintering zone or directly before the material enters the sintering zone, in which it is fired at a temperature of at least 1600° C. At least 60 percent, preferably 90 to 100 percent of the fluxing agent added should be introduced in this way from the discharge end.

The size of the grains of the fluxing material must be essentially in the range of 0.5 to 5, preferably 1.0 to 3 mm. Not more than 20 percent, preferably not more than 10 percent, of the material introduced from the discharge end should be smaller than 0.5 mm., in order to prevent removal of such fines by the draft before they had time to react with the dolomite. In other words, the particle size of the fluxing agent should be essentially of the grain size designated e.g., by Atterberg as medium and coarse sand and above that of fine sand. Suitable fluxing materials are particularly the oxides, carbonates, and silicates of the metals iron, chromium, manganese, titanium, or zirconium. Also mixtures of such compounds may be used. Instead of the pure compounds, natural minerals containing the usual impurities or commercial waste products, for instance from metallurgical operations, can be used which contain the recited metal compounds.

Particularly suitable is iron oxide as it is available, for instance, in red mud and gas purification masses. Suitable ores are iron carbonate, hematite, brown iron ore, magnetite, bog iron ore, chrome iron ore, or roasting residues. Other suitable ores are titanite, perovskite, ilmenite, braunite, manganite, manganese spar, zirconium silicate, and others.

Iron oxide is most efficient in lowering the firing temperature. If it is desired to increase the refractory qualities of the end product, compounds of the other recited metals may be more suitable.

The amount of fluxing agents in the final product should be about 3 to 12 percent by weight particularly if iron oxide is used, amounts up to 7 percent are normally sufficient. In calculating the total amount of fluxing agent to be added, the amount and nature of the impurities already contained in the dolomite, as far as they have a fluxing action, must be taken into account.

The invention will be described more in detail in the following example with reference to the accompanying drawing which shows an arrangement suitable for carrying out the invention.

In the drawing, the numeral 1 designates a conventional rotary kiln in which a charge of dolomite 2 is sintered by means of a burner 3 burning oil or coal dust. Below the burner 3, there is arranged in injection conduit 4 for blowing in the fluxing agent. It will be seen that in this way the fluxing agent is deposited on the dolomite only in, or immediately in front of, the sintering zone proper and does not come into contact with the lining of the kiln.

EXAMPLE

A rotary kiln having a length of 120 m. and an inner diameter of 3.9 m. was charged from a preheater with 410 metric tons daily of a raw dolomite crushed to a grain size of 5 to 30 mm. and having the following composition:

| | Percent |
|---|---|
| CaO | 32.4 |
| MgO | 19.0 |
| $SiO_2$ | 0.3 |
| $Al_2O_3$ | 0.2 |
| $Fe_2O_3$ | 0.2 |
| $CO_2$ | 46.8 |

During firing, the material lost 46.8 percent of its weight, in form of $CO_2$.

Through the injection pipe 4 shown in the drawing, there was blown onto the charge a continuous homogeneous current of comminuted iron ore, 90 percent of which had a grain size in the range of 1.0 to 3 mm. Only 10 percent had a size below 1.0 mm.

The iron ore used was a brown ore containing 55% Fe. The amount injected from the discharge end was 28.3 metric tons per day and so adjusted that the $Fe_2O_3$ content of the burnt dolomite increased by 5.3 percent over the original content and amounted to 5.5 percent by weight. At a firing temperature of 1780° C., the obtained burnt dolomite had a bulk density of 1700 g. per liter. No harmful ring formation inside the kiln was observed even after prolonged operation.

In order to obtain the same bulk density without injecting fluxing agent, the temperature had to be raised, under otherwise similar flow conditions, to 1850° C.

Similar results were obtained when the iron ore was replaced wholly or in part, by chrome iron ore, titanite, zirconium silicate, manganite, or the like, or on the other hand when the dolomite is replaced by magnesite or lime or mixture thereof.

We claim:

1. A method for preventing or reducing the formation of fire rings in the manufacture of refactory material wherein a raw material selected from the group consisting of dolomite, magnesite, lime, and mixtures thereof is passed through a rotary kiln from the charge end to the discharge end of the kiln, and said material is heated with a fluxing agent in the firing zone of said kiln to at least 1600° C., by burning fuel injected into the kiln, said method comprising blowing said fluxing agent below said injected fuel onto said material, while in said firing zone, from said discharge end of the kiln as particles having a grain size up to 5 mm., at least 80 percent of said fluxing agent having a grain size in excess of 0.5 mm., the amount of said fluxing agent being about 3 to 12 percent by weight of the final product.

2. The method as claimed in claim 1 wherein at least 60 percent of the total fluxing agent added to said material is introduced into the firing zone from the discharge end of the kiln.

References Cited

UNITED STATES PATENTS 1,206,771  11/1916  Barr _____ 106—61

TOBIAS E. LEVOW, *Primary Examiner.*

JAMES G. POER, *Examiner.*